United States Patent
Koh et al.

(10) Patent No.: US 8,589,143 B2
(45) Date of Patent: Nov. 19, 2013

(54) VIRTUALIZATION APPARATUS AND PROCESSING METHOD THEREOF

(75) Inventors: Kwang-Won Koh, Daejeon (KR); Kang Ho Kim, Daejeon (KR); Soo Cheol Oh, Daejeon (KR); Ki-Hyuk Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 412 days.

(21) Appl. No.: 12/969,720

(22) Filed: Dec. 16, 2010

(65) Prior Publication Data

US 2011/0153308 A1    Jun. 23, 2011

(30) Foreign Application Priority Data

Dec. 17, 2009    (KR) .................. 10-2009-0126275

(51) Int. Cl.
*G06F 9/455* (2006.01)

(52) U.S. Cl.
USPC ........................................... 703/26; 717/138

(58) Field of Classification Search
USPC ........................................................ 703/26
See application file for complete search history.

(56) References Cited

U.S. PATENT DOCUMENTS

| | | | |
|---|---|---|---|
| 7,047,394 B1 | 5/2006 | Van Dyke et al. | |
| 7,203,933 B2 * | 4/2007 | Souloglou et al. | 717/146 |
| 7,536,682 B2 * | 5/2009 | Dankel et al. | 717/139 |
| 7,565,631 B1 | 7/2009 | Banerjee et al. | |
| 7,805,710 B2 * | 9/2010 | North | 717/136 |
| 2005/0235269 A1 | 10/2005 | K N et al. | |
| 2008/0047023 A1 | 2/2008 | Lam et al. | |
| 2011/0035745 A1 | 2/2011 | Li et al. | |

FOREIGN PATENT DOCUMENTS

| | | |
|---|---|---|
| JP | 2002536712 | 10/2002 |
| KR | 10-2009-0093930 A | 9/2009 |
| WO | 2009114961 | 9/2009 |

OTHER PUBLICATIONS

Bruening et al, "An Infrastructure for Adaptive Dynamic Optimization", Proceedings of the International Symposium on Code Generation and Optimization, 2003.*
Chen et al, "Mojo: A Dynamic Optimization System", Microsoft Research, 2000.*
Bungale et al, "Supervisor-Mode Virtualization for x86 in VDebug", The Johns Hopkins University, Mar. 10, 2004.*
Fabrice Bellard, "QEMU, a Fast and Portable Dynamic Translator", Proceedings of USENIX Annual Technical Conference, pp. 41-46, Apr. 2005.

* cited by examiner

*Primary Examiner* — Mary C Jacob
(74) *Attorney, Agent, or Firm* — Kile Park Reed & Houtteman PLLC

(57) ABSTRACT

A virtualization apparatus includes: an emulation manager for searching a basic block cache for an entry with an entry point, and, if there exists no entry with the entry point in the basic block cache, requesting the identification of a basic block corresponding to the entry point; a basic block identifier for identifying the basic block by sequentially analyzing instructions of a source binary in response to a request from the emulation manager; and an instruction replacer for writing an entry of the identified basic block in a replaced instruction table, writing a branch instruction for the entry of the basic block in the source binary, and then branching to the entry point. The apparatus further includes an instruction emulator for executing an instruction of the basic block when a branch to the entry point is made.

10 Claims, 5 Drawing Sheets

VIRTUALIZATION APPARATUS AND PROCESSING METHOD THEREOF

CROSS-REFERENCE(S) TO RELATED APPLICATION(S)

The present invention claims priority of Korean Patent Application No. 10-2009-0126275 filed on Dec. 17, 2009, which is incorporated herein by reference.

FIELD OF THE INVENTION

The present invention relates to a virtualization technique, and more particularly, to a virtualization apparatus for performing virtualization by converting a source binary using a basic block cache and a processing method thereof.

BACKGROUND OF THE INVENTION

As well-known in the art, emulation is an essential technology that applies to all areas of system virtualization for existing operating systems.

Such emulation provides virtualization of graphical devices in a narrow sense and of an instruction set architecture (ISA) in a broad sense, and emulation is defined as the process of implementing the interface and functionality of a guest system on a host system having a different interface and functionality. The guest system denotes a target system to be virtualized and transplanted, and the host system denotes a physical system in which a virtualized guest actually operates.

In particular, interpretation, binary translation and the like are used for virtualization through ISA emulation. The interpretation involves fetching an instruction, analyzing the fetched instruction, and repeatedly executing an operation required as a result of the analysis. Such interpretation has the advantage of showing a low memory requirement, fast start rate, and high transplantability in performing emulation, but has the problem of very low performance in a steady state.

Moreover, although the performance is improving to indirect threaded interpretation or direct threaded interpretation based on basic interpretation, there are still problems concerning an increase in the amount of memory required and a reduction of transplantability under the circumstance that it is difficult to improve performance.

To solve these problems, a binary translation scheme was disclosed to improve performance regardless of transplantability, in which blocks of source instructions are translated to target instructions and the target instruction blocks are repeatedly executed. Such a binary translation scheme may be divided into a static binary translation scheme and a dynamic binary translation scheme.

Among them, the static binary translation scheme is not performed at runtime, and thus, there is no over-head caused by binary translation but there are a code discovery problem, a code location problem and the like. The code discovery problem means that there might exist no always-valid code following a jump instruction and data or a pad for alignment might exist between binary codes. The code location problem means that a program counter (PC) or an instruction pointer (IP) is changed by binary duplication accompanied by binary translation, and thus a PC-relative calculation part for a source binary needs to be changed to an entry point for a target binary during execution of an instruction, such as a register offset branch. This problem is basically caused by the binary translation scheme of duplicating the target binary from the source binary.

The dynamic binary translation technique is typically used for emulation to solve the code discovery problem and the code location problem. This technique is based on the principle that one dynamic basic block is translated for a single translation at an execution time.

FIG. 1 is a schematic view showing dynamic binary translation mechanism used for virtualization in the prior art. An emulation manager uses a source program counter (SPC)-target program counter (TPC) mapping table to check whether a mapping table corresponding to the SPC of the current binary exists in the SPC-TPC mapping table. If there exists no mapping table corresponding to the SPC in the SPC-TPC mapping table, a basic block is searched for in the source binary by an analyzer, and the searched basic block is converted into a target basic block by a converter. At this point, the last location of the basic block is corrected to pass its execution to the emulation manager by using the starting address of the next basic block as an argument.

Thereafter, when the converter passes the execution of the basic block to the emulation manager, the emulation manager confirms the existence of the target basic block by using the SPC-TPC mapping table for the same SPC, and branches its execution to the target basic block and repeatedly executes the basic block.

FIG. 2 is a flowchart showing a dynamic binary translation process used for virtualization in the prior art. The emulation manager searches the SPC-TPC mapping table for a mapping table corresponding to the SPC of the current binary in step 202.

Then, the emulation manager checks whether the mapping table corresponding to the SPC of the current binary exists in the SPC-TPC table based on the result of search in step 204.

As a result of check in step 204, if there exists no mapping table corresponding to the SPC in the SPC-TPC mapping table, a basic block is searched for in the source binary by the analyzer in step 206.

Next, the searched basic block is converted into a target basic block by the converter in step 208. At this point, the last location of the basic block is corrected to pass its execution to the emulation manager by using the starting address of the next basic block as an argument.

Thereafter, the emulation manager executes the corresponding target basic block translated by a translator in step 210.

Meanwhile, as a result of check in step 204, if there exists a mapping table corresponding to the SPC in the SPC-TPC mapping table, a branch is made to the searched target basic block in step 212, and the emulation manager executes the corresponding target basic block translated by the translator in step 214.

Next, the emulation manager invokes an SPC for the next block in step 216, and repeatedly performs steps 202 to 214 in step 218.

Accordingly, during the course of repeated execution, the emulation manager is able to confirm the existence of the target basic block using the SPC-TPC mapping table for the same SPC and to branch its execution to the target basic block and execute the basic block.

FIG. 3 illustrates a view for explaining a virtualization operation using a dynamic binary translation apparatus in the prior art. An emulation manager 302 searches an SPC-TPC mapping table 304 for 0, which is the PC of a source (i.e., SPC).

If SPC:0 exists in the SPC-TPC mapping table 304, the emulation manager 302 fetches the address of a target basic block 306, and executes the target basic block 306.

However, if there exists no SPC:0 in the SPC-TPC mapping table 304, source basic blocks starting from 0 of a source binary 310 are searched for by sequential analysis by an analyzer 308. The analyzer 308 which have searched for source basic blocks 0-10 transfers them to a translator 312. The translator 312 translates the source basic blocks into target basic blocks, write them in a basic block cache 306, and write a tuple consisting of an SPC of 0 and a TPC as the starting addresses of the target basic blocks in the SPC-TPC mapping table 304. At this time, the last location of a translated source basic block may be replaced by not a branch to the next basic block but a branch to the emulation manager 302 by using the starting address 12 of the next basic block as an argument.

Thereafter, the translator 312 passes the execution of the basic block to the emulation manager 302, and the emulation manager 302 fetches the starting address of the translated basic block whose SPC is 0 from the SPC-TPC mapping table 304 and executes the corresponding basic block.

As described above, the virtualization using binary translation of the prior art has many advantages because its processing speed is high compared to interpretation, but has a limitation when applied to a system with limited memory resources. This is because the amount of memory resources required increases since the duplicate of an operating code is created and the code is modified/operated based on the duplicate.

In addition, management using locality may be applied to reduce the amount of memory resources required. However, this inevitably causes performance degradation. Hence, it is necessary to develop a binary translation technology which makes users free from memory restrictions and minimizes performance degradation.

SUMMARY OF THE INVENTION

It is, therefore, an object of the present invention to provide a space virtualization apparatus, which can minimize memory use due to virtualization by minimizing the size of a basic block and converting a source binary by a basic block cache configured corresponding to the basic block size to execute virtualization in place (VIP), and its processing method.

In accordance with an aspect of the present invention, there is provided a virtualization apparatus including: an emulation manager for searching a basic block cache for an entry with an entry point, and, if there exists no entry with the entry point in the basic block cache, requesting the identification of a basic block corresponding to the entry point; a basic block identifier for identifying the basic block by sequentially analyzing instructions of a source binary in response to a request from the emulation manager; an instruction replacer for writing an entry of the identified basic block in an replaced instruction table (RIT), writing a branch instruction for the entry of the basic block in the source binary, and then branching to the entry point; and an instruction emulator for executing an instruction of the basic block when a branch to the entry point is made.

In accordance with another aspect of the present invention, there is provided a method for processing a virtualization apparatus. The method includes: searching a basic block cache for an entry with an entry point, and, if there exists no entry with the entry point in the basic block cache, requesting the identification of a basic block corresponding to the entry point; identifying the basic block by sequentially analyzing instructions of a source binary in response to a request from an emulation manager; writing an entry of the identified basic block in an replaced instruction table (RIT), writing a branch instruction for the entry of the basic block in the source binary, and then branching to the entry point; and executing an instruction of the basic block when a branch to the entry point is made.

In accordance with the aspects of the present invention, when the virtualization apparatus searches the basic block cache for an entry with a certain entry point, and passes the execution of an instruction using the entry point and length of a basic block as arguments, identified using a PC of the entry point as an argument, the last instruction of the basic block is read and written in an RIT, and an instruction for branching to an instruction emulator using the index corresponding to the written entry as an argument is written in the location of the last instruction of the basic block, thereby branching to the corresponding entry point to execute a required instruction of the basic block. Accordingly, dynamic binary translation can be performed without binary duplication and an instruction can be executed without duplicating the entire basic block, thus reducing the amount of memory required and ensuring performance in a steady state.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

The present invention involves a virtualization apparatus, in which, when an entry with a certain entry point is searched for in a basic block cache, a basic block identifier is invoked by using the entry point as an argument, and a dynamic basic block is identified by the invoked basic block identifier and the execution of an instruction of the basic block is passed to an instruction replacer using the entry point and length of the identified basic block as arguments, the last instruction of the basic block is read and written in a replaced instruction table (RIT), and an instruction for branching to an instruction emulator using the index corresponding to the written entry as an argument is written in the location of the last instruction of the basic block, thereby allowing the instruction replacer to branch to the corresponding entry point and execute a required instruction of the basic block. By such technique, the problems in the prior art can be overcome.

Hereinafter, embodiments of the present invention will be described in detail with reference to the accompanying drawings which form a part hereof.

Figure 1:
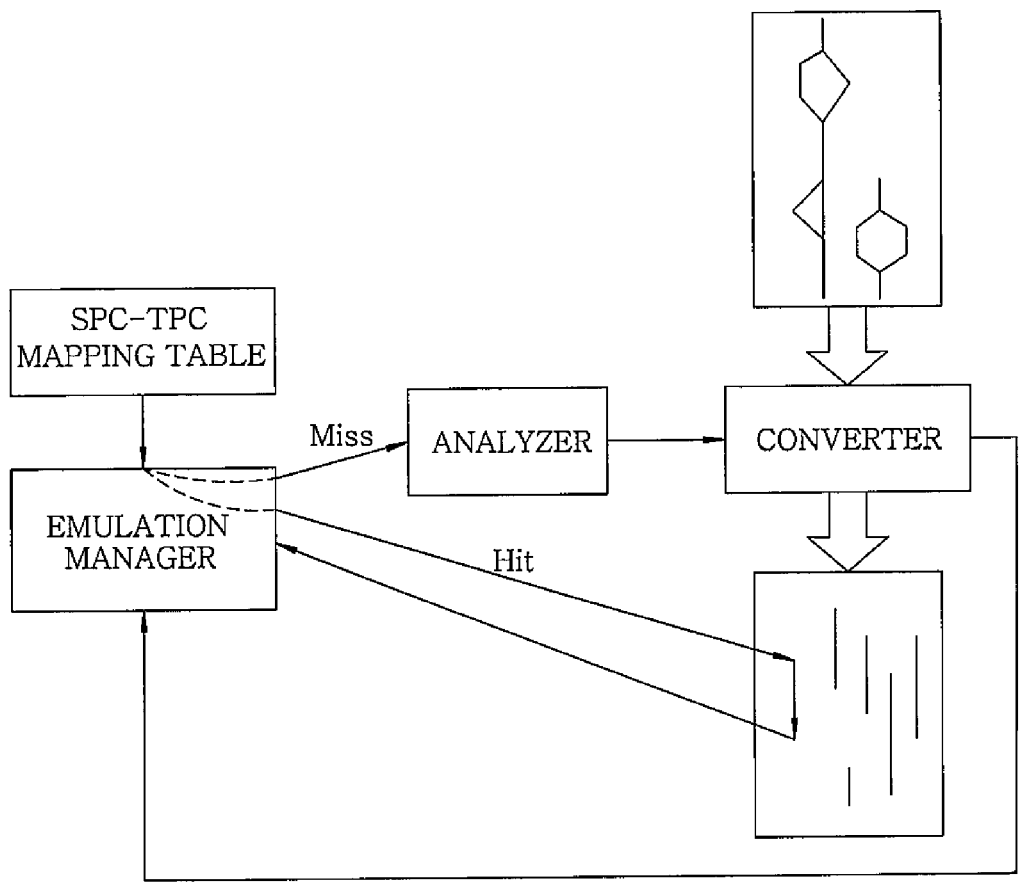
FIG. 1 is a schematic view showing dynamic binary translation mechanism used for virtualization in the prior art.
Figure 2:
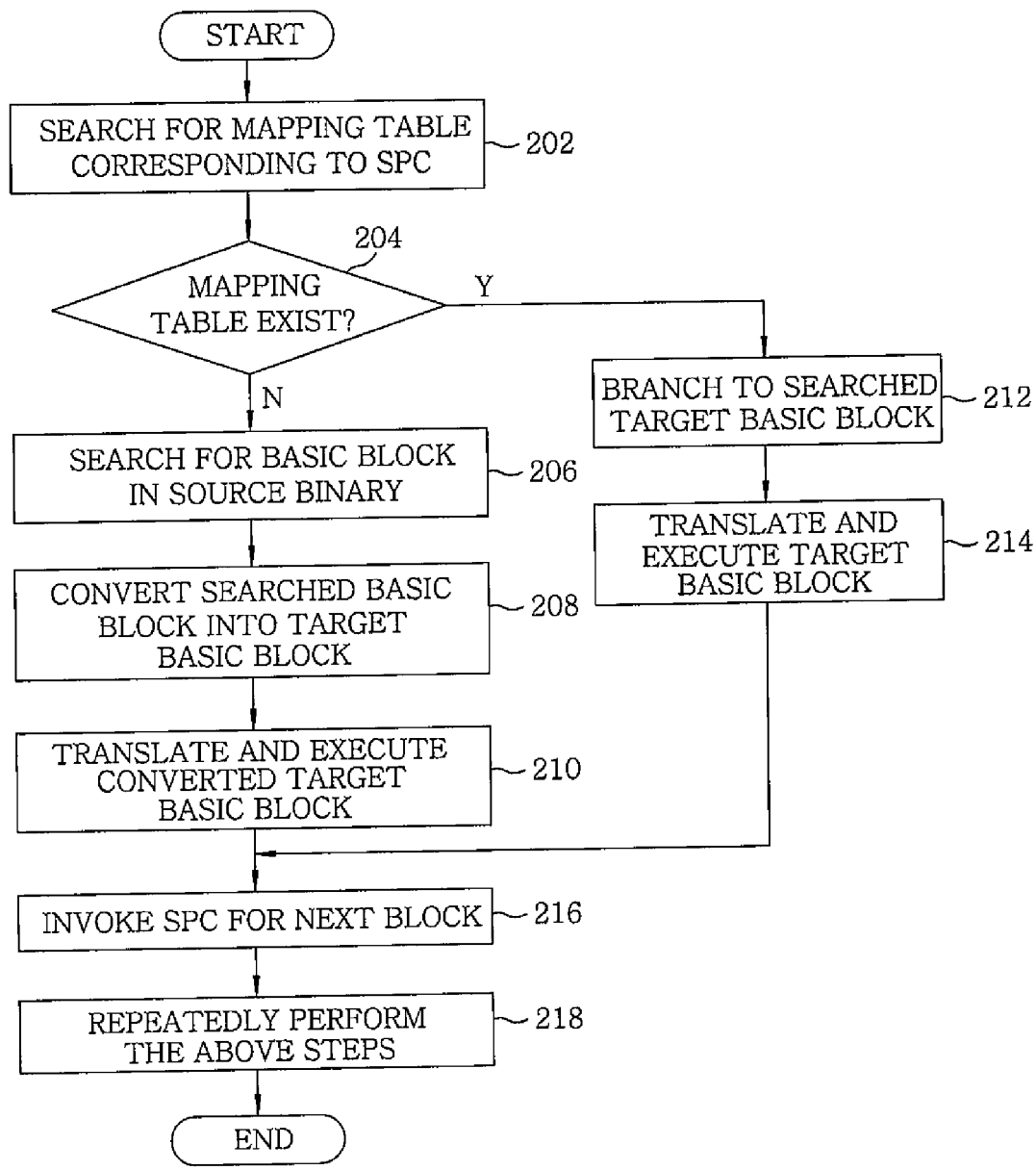
FIG. 2 is a flowchart illustrating a dynamic binary translation process used for virtualization in the prior art.
Figure 3:
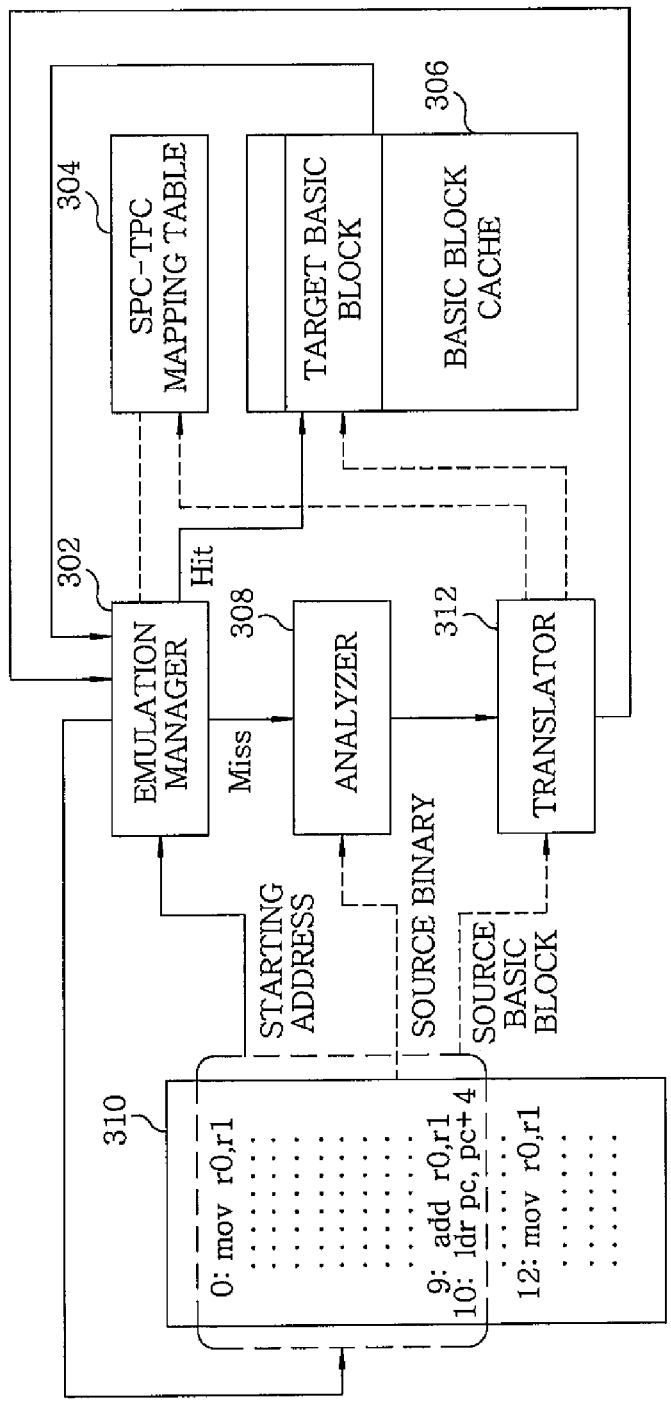
FIG. 3 is a view for explaining a virtualization operation using a conventional dynamic binary translation apparatus.
Figure 4:
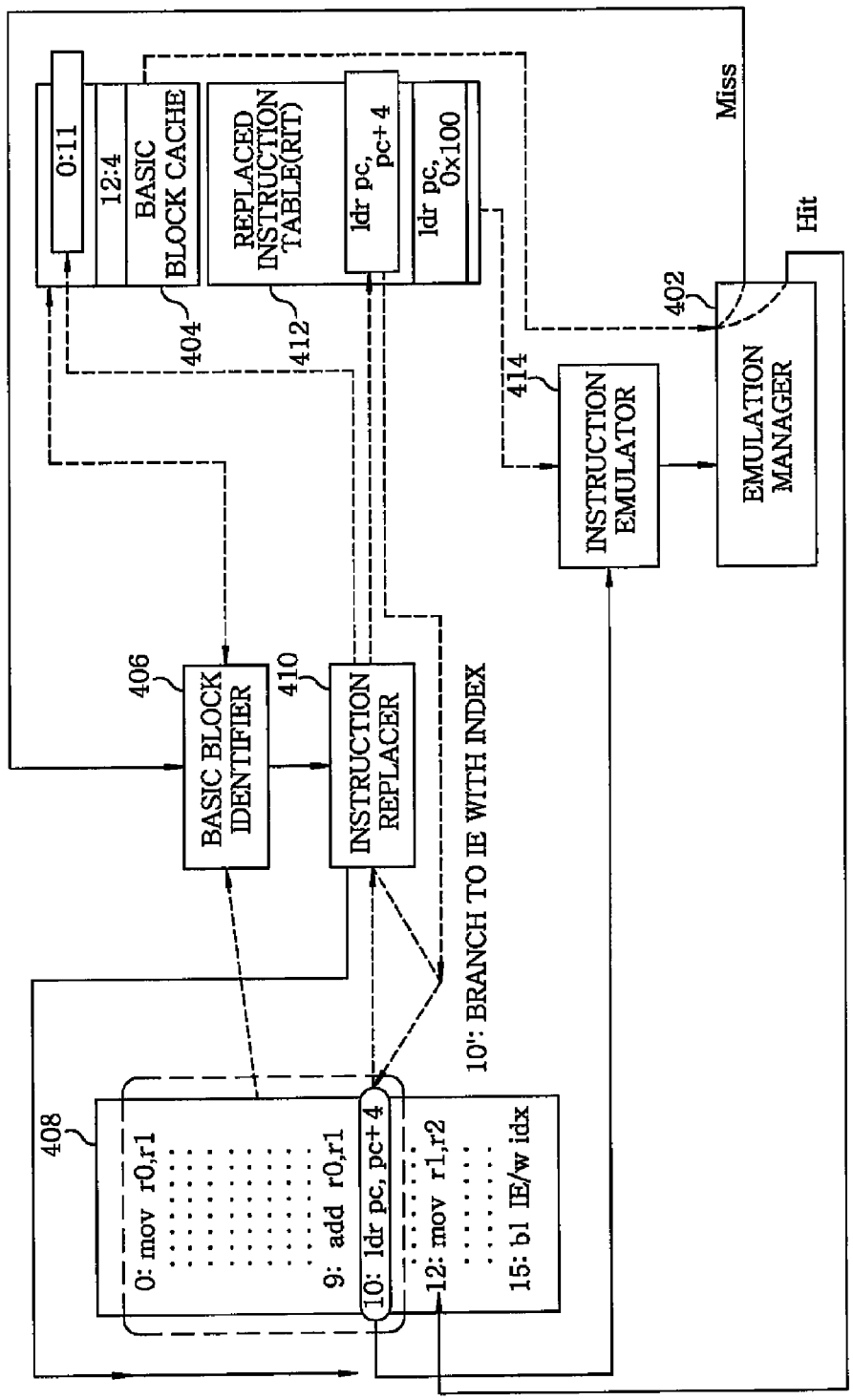
FIG. 4 illustrates a block diagram of a space virtualization apparatus suitable for space virtualization in accordance with an embodiment of the present invention.

FIG. 4 illustrates a block diagram of a virtualization apparatus suitable for space virtualization using binary translation in accordance with an embodiment of the present invention. The virtualization apparatus includes an emulation manager 402, a basic block cache 404, a basic block identifier 406, a source binary 408, an instruction replacer 410, a replaced instruction table (RIT) 412 and an instruction emulator 414.

Referring to FIG. 4, the emulation manager 402 searches the basic block cache 404 for an entry with an entry point of PC:0. If there is no corresponding entry (Miss), the emulation manager 402 invokes the basic block identifier 406 by using PC:0 as an argument. Although the basic block cache 404 provides a similar function to that of the prior art SPC-TPC mapping table, there exists no difference between SPC and TPC because it does not duplicate a basic block.

In addition, if there exists the corresponding entry (Hit), the emulation manager 402 fetches an instruction at a branch instruction location (i.e., entry point and basic block length) from a replaced instruction table (RIT) 412, and checks whether or not to directly branch the instruction to the instruction emulator 414. When the instruction is directly branched, the fetched instruction is replaced with the original instruction of the source binary 408. On the other hand, when the instruction is indirectly branched, the instruction is branched to the corresponding entry point.

The basic block identifier 406 is invoked by the emulation manager 402 to identify a basic block (i.e., dynamic basic block) by sequentially analyzing the instructions of the source binary 408 from the argument of PC:0, and passes the instructions to the instruction replacer 410 by using the entry point and basic block length of the identified basic block as an argument.

Then, the instruction replacer 410 reads the last instruction (e.g., 10:ldr pc, pc+4) of the identified basic block and writes the entry thereof in the RIT 412, and writes an instruction for branching to the instruction emulator 414 by using the index of the written entry in the RIT 412 as an argument at the last instruction location of the basic block. Thereafter, the instruction is branched to the entry point to execute the corresponding basic block through the instruction emulator 414.

For example, a basic block of the source binary 408 has a length of 11 starting from 0. Thus, instructions 0-9 are executed in the same manner as the original source binary 408. When the location of instruction 10 is reached, the basic block replaced with a branch instruction to the instruction emulator 414 executes instruction 10', and accordingly passes its execution to the instruction emulator 414.

The instruction emulator 414, which have received the execution, decodes the instruction 10' to extract the index thereof in the RIT 412, invokes the original instruction from the RIT 412 by using the extracted index, executes the corresponding instruction depending on the invoked original instruction, and then detects the next instruction. As shown in FIG. 4, in one example, it can be seen that instruction 12 is shown as the next instruction in the source binary 408.

Thereafter, the emulation manager 402 searches the basic block cache 404 for an entry with an entry point of PC:12, and is able to find out that the corresponding instruction has been already replaced since the corresponding entry exists (Hit).

At this point, instruction 15 positioned in the $15^{th}$ line of the source binary 408 is decoded to find the index, and the corresponding instruction is searched for in the RIT 412 by using the found index. In case of register relative branch in which the searched instruction is dynamically changed (i.e., indirect branch), the instruction is branched to the entry point of PC:12, and in case of direct branch, the original branch existing in the RIT 412 is again written in the $15^{th}$ line of the source binary 408.

Therefore, when an entry with a certain entry point is searched for in a basic block cache 404, a basic block identifier 406 is invoked by using the entry point as an argument, a dynamic basic block is identified by the invoked basic block identifier 406, and the execution of an instruction of the basic block is passed to an instruction replacer 410 by using the entry point of the identified basic block and the basic block length as arguments, the last instruction of the basic block is read and written in an RIT 412, and an instruction for branching to an instruction emulator 414 by using the index corresponding to the written entry as an argument is written in the location of the last instruction of the basic block, thereby allowing the instruction replacer 410 to branch to the corresponding entry point to effectively execute a required instruction of the basic block.

Next, a process of space virtualization using binary translation in the virtualization apparatus having the above configuration in accordance with the embodiment of the present invention will be described by referring to FIG. 5.

Figure 5:
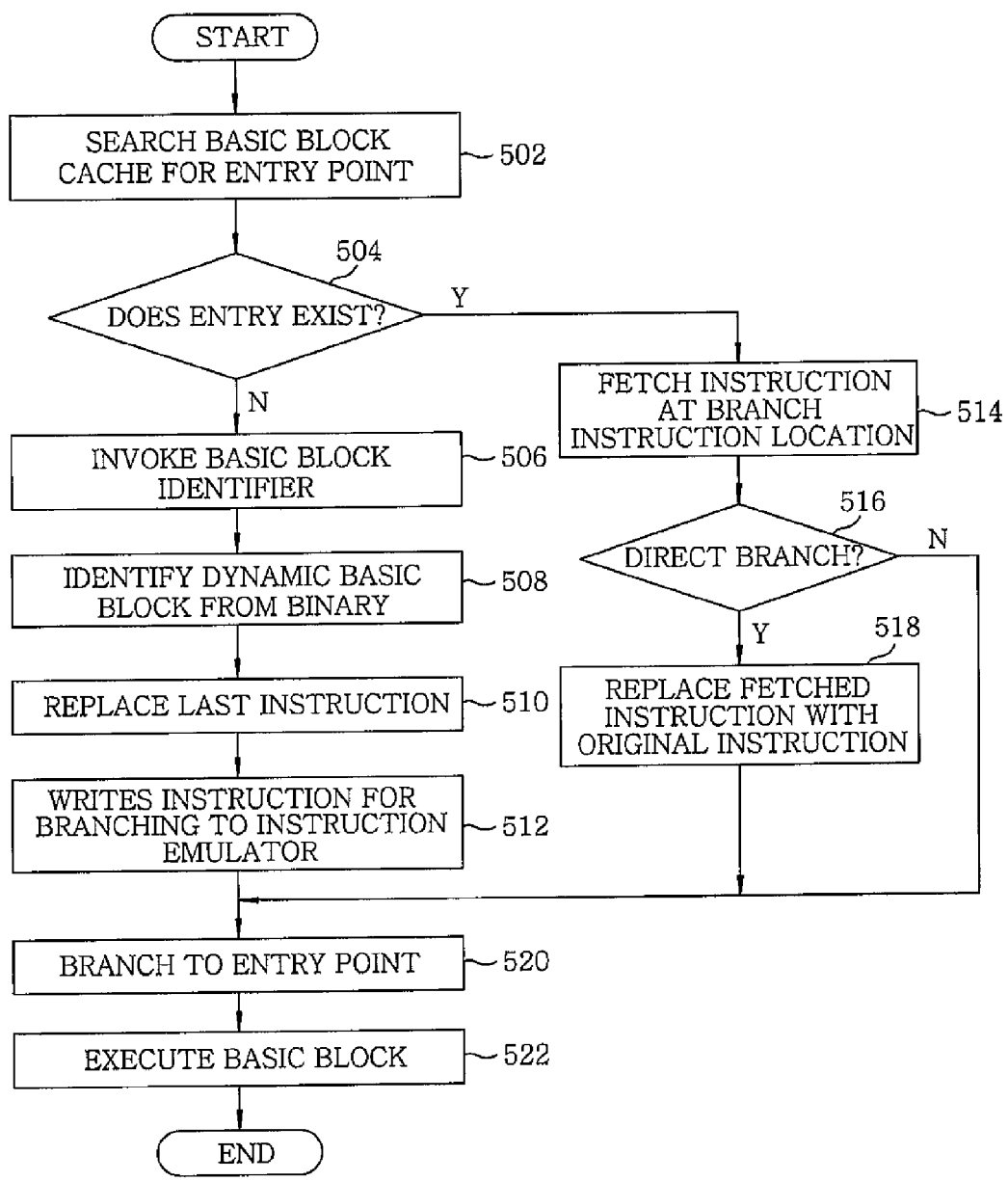
FIG. 5 is a flowchart illustrating a process of space virtualization in accordance with the embodiment of the present invention.

In FIG. 5, the emulation manager 402 searches the basic block cache 404 for an entry with an entry point of PC:0 in step 502, and checks whether there exists the corresponding entry in step 504.

As a result of check in step 504, if there exists no corresponding entry (Miss), the emulation manager 402 invokes the basic block identifier 406 by using PC:0 as an argument in step 506.

The basic block identifier 406 is invoked by the emulation manager 402 to identify a basic block (i.e., dynamic basic block) by sequentially analyzing the instructions of the source binary 408 from the argument of PC:0 in step 508.

Additionally, the basic block identifier 406 passes the instructions to the instruction replacer 410 by using the entry point and a length of the identified basic block as an argument. The instruction replacer 410 replaces the instructions by reading the last instruction (i.e., 10:ldr pc, pc+4) of the identified basic block and writing the entry thereof in the RIT 412 in step 510.

Next, the instruction replacer 410 writes an instruction for branching to the instruction emulator 414 by using the index of the written entry in the RIT 412 as an argument at the last instruction location of the basic block in step 512.

On the other hand, as a result of check in step 504, if there exists the corresponding entry, the emulation manager 402 fetches an instruction at the location of a branch instruction (i.e., the entry point and length of the basic block) from the RIT 412 in step 514.

Next, the emulation manager 402 checks whether the instruction is directly branched to the instruction emulator 414 in step 516.

As a result of check in step 516, if the instruction is directly branched, the emulation manager 402 replaces the fetched instruction with the original instruction of the source binary 408 in step 518.

On the other hand, as a result of check in step 516, if the instruction is indirectly branched, the instruction is branched to the corresponding entry point in step 520 and the instruction of the corresponding basic block is executed by the instruction emulator 414 in step 522. Of course, steps 520 and 522 are also carried out after writing in the last instruction location of the basic block in step 512. With the above-described process, dynamic binary translation can be performed without binary duplication and an instruction can be executed without duplicating the entire basic block, thus reducing the amount of memory required and ensuring performance in a steady state.

While the invention has been shown and described with respect to the particular embodiments, it will be understood by those skilled in the art that various changes and modification may be made without departing from the scope of the invention as defined in the following claims.

What is claimed is:

1. A virtualization apparatus comprising:
    an emulation manager for searching a basic block cache for an entry with an entry point, and, if there exists no entry with the entry point in the basic block cache, requesting an identification of a basic block corresponding to the entry point;
    a basic block identifier for identifying the basic block by sequentially analyzing instructions of a source binary in response to a request from the emulation manager;
    an instruction replacer for writing an entry of the last instruction of the identified basic block in a replaced instruction table, writing a branch instruction in a location of the last instruction of the basic block in the source binary, and then branching to the entry point; and
    an instruction emulator for executing instructions of the basic block when a branch to the entry point is made,
    wherein the branch instruction comprises an index corresponding to the written entry of the last instruction in the replaced instruction table.

2. The virtualization apparatus of claim 1, wherein, if there exists the entry with the entry point in the basic block cache, the emulation manager fetches an instruction at a branch instruction location from the replaced instruction table and then branches the instruction to the entry point.

3. The virtualization apparatus of claim 2, wherein, when the fetched instruction is branched directly to the instruction emulator after fetching the instruction at the branch instruction location, the emulation manager replaces the fetched instruction at the branch instruction location with an original instruction of the source binary.

4. The virtualization apparatus of claim 3, wherein the instruction emulator decodes the branch instruction to extract the index, invokes the original instruction from the replaced instruction table using the extracted index, and executes the instructions of the basic block depending on the invoked original instruction.

5. The virtualization apparatus of claim 4, wherein the branch instruction location comprises the entry point and length of the basic block.

6. A method for processing a virtualization apparatus, the method comprising:
    searching a basic block cache for an entry with an entry point, and, if there exists no entry with the entry point in the basic block cache, requesting an identification of a basic block corresponding to the entry point;
    identifying the basic block by sequentially analyzing instructions of a source binary in response to a request from an emulation manager;
    writing an entry of the last instruction of the identified basic block in a replaced instruction table, writing a branch instruction in a location of the last instruction of the basic block in the source binary, and then branching to the entry point; and
    executing instructions of the basic block when a branch to the entry point is made,
    wherein the branch instruction comprises an index corresponding to the written entry of the last instruction in the replaced instruction table.

7. The method of claim 6, further comprising, if there exists the entry with the entry point in said searching a basic block cache, fetching an instruction at a branch instruction location from the replaced instruction table and then branching the instruction to the entry point.

8. The method of claim 7, wherein, when the fetched instruction is branched directly to the instruction emulator after fetching the instruction at the branch instruction location, said fetching an instruction comprises replacing the fetched instruction at the branch instruction location with an original instruction of the source binary.

9. The method of claim 8, wherein said executing instructions of the basic block comprises decoding the branch instruction to extract the index, invoking the original instruction from the replaced instruction table using the extracted index, and executing the instructions of the basic block depending on the invoked original instruction.

10. The method of claim 9, wherein the branch instruction location comprises the entry point and length of the basic block.

* * * * *